Patented Dec. 28, 1965

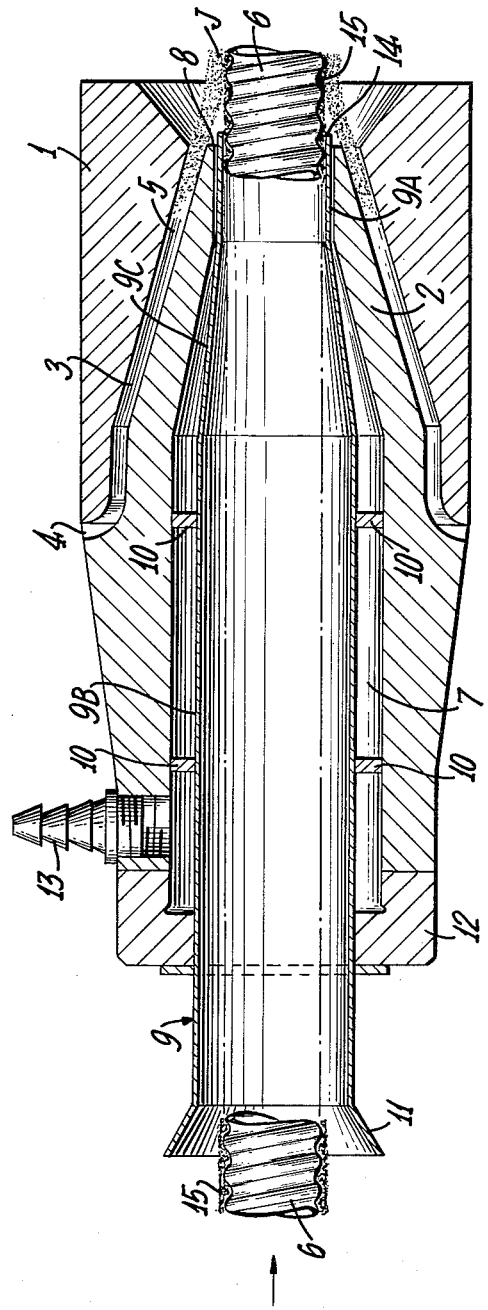

1

3,225,385
APPARATUS FOR MAKING JACKETED TUBULAR MEMBERS
Friedrich Kleine, Hannover, Germany, assignor to Hackethal- Draht- und Kabel-Werke Aktiengesellschaft, Hannover, Germany
Filed Jan. 2, 1963, Ser. No. 248,990
Claims priority, application Germany, Jan. 3, 1962, H 44,526
7 Claims. (Cl. 18—13)

This invention relates to apparatus for making jacketed tubular members, and more particularly concerns means for applying corrosion protective material and an outer plastic jacket to sheaths, electrical cables and the like.

Metal sheaths, tubes and the like, which are to be buried in the ground are usually provided with means for protecting the same against corrosion. This is of particular importance in the case of electrical cables with the recent trend of superseding the conventional corrosion resistant lead sheathing with other materials having superior electrical and mechanical properties, including better flexibility, increased mechanical strength and good electrical characteristics.

Especially concerned are sheaths of steel, copper or aluminum in pure form, as for example, thinly plated copper on steel. However, such metallic sheaths are much less resistant to corrosion than the known lead sheath and even lead required a certain amount of protection against corrosion. With the newer metal sheaths, corrosion protection is mandatory. While cables having such sheaths are provided with extruded plastic jackets, such jackets do not adhere uniformly and tightly to the outer surface of the metal sheath. Cables with jackets which are not tightly adherent thereto are still subject to corrosion.

Corrosion preventive compositions are well known in the art as typified by bitumen, tar or mixtures thereof with additions of chalk, talcum, sawdust, powdered cork, thermoplastic high polymers and the like; which compositions afford good protection against corrosion and are compatible with the materials forming the plastic jackets applied over the protected cable sheath. However, with the conventional extruding apparatus used in applying plastic jackets over the protected cable sheath, difficulties have been encountered in obtaining a direct coating of the corrosion resistant material which is of uniform thickness under the plastic jacket.

Such difficulties are due in part, to the liquification of the corrosion protective coating at the temperatures incident to the jacket extruding operation. This caused changes in the opening at the extruding head through which the plastic material flows so that the resultant jackets were of uneven wall thickness.

Accordingly, the device of the instant invention provides improved means for applying to elongated tubular members such as tubes, cables, sheaths or the like, an inner layer of corrosion resistant material and an outer plastic jacket whereby the inner layer and the outer jacket are of uniform wall thickness and provide for uniform adherence of the jacket throughout the inner surface portions thereof to the core element.

In accordance with the invention, the usual cross head extruder, particularly adapted for jacketing electrical cables, comprises a matrix and bored mandrel through which the cable passes for application of the jacketing material thereto. Such mandrel is provided with a gauging tubular member disposed concentrically within the bore thereof.

The gauging tubular member has a length at least equal to that of the bore of the mandrel; the exit end of the tubular member extending to the exit end of the mandrel and preferably projects slightly beyond the exit end of the mandrel. Also, the gauging member has an inner diameter at its exit end substantially equal to the diameter of the cable passing therethrough, whereas the inner diameter of said member is larger than the diameter of the cable, at all other portions thereof; yet the outer diameter of such gauging member portions is less than the diameter of the bore of the mandrel at corresponding points; however there is an annular space between the gauging member and the mandrel bore at all points in the length thereof.

With a device of such construction, the corrosion protective material initially applied to the cable sheath or the like, is progressively compacted about the moving sheath and the thickness thereof reduced until the exit end of the device where the thickness of the applied material is accurately gauged and centered with respect to the exit end of both the tube and mandrel. Also, a change in section of the gauging tube insures removal of any irregularities in the mass of protective material as originally applied to the sheath at the entrance end of the device. Furthermore, the construction of the instant device insulates the mass of protective material against sudden temperature increases.

Thus, the protective material is maintained in a thickened condition and avoiding fouling the orifice through which the plastic jacketing material is extruded over the coated cable sheath and leaving the protective layer of even thickness as the same makes contact with the extruded jacketing material. In general, the instant device avoids undue changes in temperatures of the mandrel, the sheath being treated or the protective composition applied thereto.

The gauge tube may be removable from the mandrel, thus allowing the same extrusion head to be used in making sheaths and tubular articles of various dimensions. Also, with the gauge tube removed, the extruder may be used in applying jacketing directly to a sheath where no corrosion protective material need be applied.

In the drawing, the single figure is a schematic showing of a device embodying the invention, in longitudinal section.

Such device comprises the extruder head portion of a conventional plastic extruder, not shown in detail. The device comprises a matrix member 1 and a bored mandrel 2 of the extrusion head of a screw type extruder. In the usual manner, matrix member 1 and mandrel 2 are disposed to provide an annular channel 3 of conical shape, with an annular entrance at 4 for receiving the usual plastic jacketing material, and an orifice 5 where the freshly formed jacket envelopes a cable 6.

Cable 6, by way of example, is of the corrugated sheath type, where the sheath is formed of a suitable metal, alloy or plated base and is to be provided with a coating of corrosion protective material prior to application of the plastic jacketing.

Mandrel 2 has a longitudinal bore providing a space 7 of varying diameter extending to the terminal end 8 thereof. In accordance with the invention, a gauge tube 9 is disposed within space 7 and is concentrically related thereto. The tube 9 is maintained in proper position by spacing elements 10. The tube 9 projects at its rear end outwardly of the mandrel 2 and includes at its outer end a wipeoff collar 11. The mandrel 2 is closed at its rear end by a cap 12 suitably secured to the mandrel end. The annular space 7 is maintained at reduced pressures by means of a nozzle connection 13 suitably connected to a vacuum pump, not shown, and a vacuum of from 10 to 100 torr. is maintained.

The gauge tube 9 includes a front end portion 9A of reduced diameter and with an outer diameter slightly less than the inner diameter at the exit end of mandrel 2. Preferably, the forward edge of tube portion 9A projects slightly beyond the terminal end 8 of the mandrel 2. The tube 9 further includes a major portion 9B of enlarged diameter compared to the diameter of cable sheath 6 passing therethrough, and a conical portion 9C which gradually connects the tube portions 9A and 9B.

The cable sheath 6 is initially passed through a tank, not shown, which contains a conventional corrosion resistant composition, of the bitumen, tar or other type and thus leaves the tank with an applied coating indicated at 15. The protective material is kept in the tank at a temperature which will provide a suitable viscosity to the material so that it will cling to cable sheath 6, as the same moves through gauge tube 9 and will uniformly cling to the upper as well as lower circumferential portions of sheath 6.

As the gauge tube 9 decreases in its inner diameter approaching the exit end 14 thereof, the thick protective material applied to sheath 6 will be evenly coated about said sheath including the deep corrugations thereof. Also, the cable sheath 6 will be properly centered relative to the tube 9 causing the applied thick coating 15 to be uniformly applied over the high points of cable sheath 6 as the sheath will not make contact with the inner surfaces of the tube 9 including the reduced exit end portion 9A where the inner diameter thereof is slightly larger then the outer diameter of sheath 6 at its high points.

The annular space 7 about tube 9 is effective in insulating the same and the moving sheath 6 with its coating thereon, to minimize temperature rises which might tend to deform or liquify the coating 15. Additional insulation, not shown, may be provided in space 7 to this end. Such space 7 is also sealed off against the entry of foreign matter, by cap 12 avoiding possible deposition of such matter between the jacket and the corrosion protective layer.

With reduced pressures in space 7, the freshly formed plastic jacket J issuing from orifice 5 is made tightly adherent to the coated sheath 6 and eliminating any spaces between the jacket and the coating.

Excess composition 15 moved rearwardly in gauge tube 9 as well as material wiped off by collar 11 may be collected in a suitable container, not shown, positioned below collar 11, for reuse and addition to the tank, not shown, through which cable sheath 6 initially passes.

Temperature measuring and control means, not shown, may be suitably located relative to the mandrel 2 or gauge tube 9, or both.

As various changes might be made in the embodiment of the invention herein disclosed without departing from the spirit thereof, it is understood that all matter herein shown or described is illustrative and not limiting except as set forth in the appended claims.

What is claimed is:

1. In a device for providing a plastic jacket over an elongated element bearing a viscous corrosion resistant composition comprising a matrix member and a mandrel member arranged to provide therebetween an extrusion channel for forming said plastic jacket, said mandrel having a longitudinal bore, the improvement comprising a gauge tube disposed concentrically within the bore of said mandrel, said gauge tube having an extended portion of enlarged diameter compared to the diameter of the elongated element passing therethrough for compacting the viscous composition uniformly about the exterior of the elongated element and a short exit portion of reduced diameter slightly greater than the outside diameter of said elongated element for gauging the viscous composition on said elongated element to provide a coating of uniform thickness on said elongated element immediately before the application of said plastic jacket.

2. A device as in claim 1 wherein the exit end of said gauge tube projects slightly beyond the extrusion orifice of said extrusion channel whereby the plastic jacket is extruded into direct contact with the gauged coating of viscous material on said elongated element.

3. A device as in claim 1 wherein the inner surface of the bore of said mandrel and the outer surface of said gauge tube are spaced to provide an insulating space over the major portion of the longitudinal extent of said gauge tube whereby to insulate the viscous composition on the elongated element from the elevated extruding temperatures of said device.

4. A device as in claim 3 and including means for maintaining reduced pressure conditions within said insulating space, said gauge tube at its exit end being slightly spaced relative to the exit end of the bore of said mandrel to provide a small annular space connecting said insulating space with the extrusion channel whereby said reduced pressure conditions eliminate any spaces between the extruded plastic jacket and the gauged coating of viscous material on the elongated element.

5. In a device for applying an extruded plastic jacket over and in tightly adherent relation to a viscous corrosion resistant composition carried on the exterior surface of a tubular element, said device comprising a matrix member and a longitudinally bored mandrel member in concentric relation to each other to provide an annular extrusion channel for forming the extruded plastic jacket at the orifice end of said channel, means for compacting the applied viscous composition on said tubular element and gauging said composition to a uniform thickness in advance of the application of said plastic jacket, said means comprising an elongated gauge tube concentrically located within the bore of said mandrel member with the forward end thereof located slightly beyond the orifice end of said extrusion channel, the rear end of said gauge tube projecting rearwardly from the rear end of said mandrel member, cap means for closing off the rear end of said mandrel member and formed with a central opening for passing a rear portion of said gauge tube, said gauge tube having an inside diameter over a major portion of the longitudinal extent thereof from the rear end thereof to a point short of the forward end thereof which is greater than the outside diameter of said tubular element whereby the viscous composition carried by the tubular element is compacted about said element, said gauge tube further including a forwardly extending longitudinal portion of progressively decreasing inside diameter and a forward terminal end portion of a uniform inside diameter only slightly greater than the outside diameter of said tubular element whereby the compacted viscous composition is progressively reduced in diameter to a uniform thickness over said tubular element whereby the extruded plastic jacket issuing at the orifice end of said extrusion channel is tightly adhered to the compacted viscous composition of uniform thickness on the tubular element.

6. In a device as in claim 5 wherein the outer surface of the gauge tube and the bore of the mandrel member are spaced to provide an insulating space therebetween over a major portion of the longitudinal extent of said gauge tube to insulate the viscous composition carrying tubular element passing through said gauge tube from the elevated temperature of the extrusion channel.

7. In a device as in claim 6 and including means for maintaining said insulating space at reduced pressures, said insulating space communicating at its forward end with the orifice of said extrusion channel to insure tight adherence of the freshly extruded plastic jacket to the compacted viscous composition on the tubular element.

References Cited by the Examiner

UNITED STATES PATENTS

| | | | |
|---|---|---|---|
| 2,550,555 | 4/1951 | Hallam et al. | 18—13 |
| 2,732,588 | 1/1956 | Myers | 18—13 |
| 2,740,158 | 4/1956 | Brown. | |
| 2,963,750 | 12/1960 | Pavlic | 18—13 |
| 2,979,431 | 4/1961 | Perrault | 18—13 |

FOREIGN PATENTS 516,615  2/1955  Italy.

WILLIAM J. STEPHENSON, *Primary Examiner.*

J. SPENCER OVERHOLSER, *Examiner.*